US012614750B2

(12) United States Patent
Shao et al.

(10) Patent No.: US 12,614,750 B2
(45) Date of Patent: Apr. 28, 2026

(54) PRESSING MECHANISM WITH VARIABLE DISTANCE POSITION AND EQUAL DIVIDING FOR CHARGING AND DISCHARGING OF THE SQUARE BATTERY

(71) Applicant: ZHEJIANG HANGKE TECHNOLOGIES CO., LTD., Hangzhou (CN)

(72) Inventors: Yuzhang Shao, Hangzhou (CN); Chunfei Shou, Hangzhou (CN); Ji Cao, Hangzhou (CN); Zheng Cao, Hangzhou (CN)

(73) Assignee: ZHEJIANG HANGKE TECHNOLOGIES CO., LTD., Hangzhou (CN)

( * ) Notice: Subject to any disclaimer, the term of this patent is extended or adjusted under 35 U.S.C. 154(b) by 636 days.

(21) Appl. No.: 18/100,243

(22) Filed: Jan. 23, 2023

(65) Prior Publication Data

US 2024/0170715 A1    May 23, 2024

(30) Foreign Application Priority Data

Nov. 18, 2022  (CN) ......................... 202211444068.X
Dec. 8, 2022   (CN) ......................... 202211570261.8

(51) Int. Cl.
*H01M 10/04*     (2006.01)
*H01M 10/0525*   (2010.01)
*H01M 10/44*     (2006.01)
*H01M 10/48*     (2006.01)

(52) U.S. Cl.
CPC ..... *H01M 10/0481* (2013.01); *H01M 10/446* (2013.01); *H01M 10/486* (2013.01); *H01M 10/0525* (2013.01)

(58) Field of Classification Search
CPC ........... H01M 10/0481; H01M 10/446; H01M 10/486; H01M 10/0525
USPC ......................................................... 29/623.1
See application file for complete search history.

(56) References Cited

U.S. PATENT DOCUMENTS

2018/0191023 A1* 7/2018 Cao ................... H01M 10/0525

FOREIGN PATENT DOCUMENTS

CN           109713388 A  *  5/2019

* cited by examiner

*Primary Examiner* — Allison Bourke
*Assistant Examiner* — Robert Gene West
(74) *Attorney, Agent, or Firm* — MUNCY, GEISSLER, OLDS & LOWE, P.C.

(57) ABSTRACT

A pressing mechanism with variable distance position and equal dividing for charging and discharging of the square battery comprises a frame; a pressing mechanism between top and bottom portions of the frame, comprising a lifting saddle, a lifting driving cylinder and restraining trays; a cam at the rear terminal of the restraining tray holder; a probe assembly at the bottom of the top frame, comprising probe modules having a probe module frame, a linear sliding rail holder, a linear sliding rail, a reset unit, a wire connector and probe units, the reset unit comprising a cam contact block and a horizontal driving unit connected with the front terminal of the cam contact block; the horizontal driving unit is at the rear terminal of the linear sliding rail holder; a wedge-shaped driving surface and a vertical surface matching with the cam are on the cam contact block from bottom to top.

9 Claims, 10 Drawing Sheets

221

2212

2211

2212

2211

221

213

12

11

36

2212

221

2211

36

221

PRESSING MECHANISM WITH VARIABLE DISTANCE POSITION AND EQUAL DIVIDING FOR CHARGING AND DISCHARGING OF THE SQUARE BATTERY

TECHNICAL FIELD

The invention relates to a pressing mechanism for charging and discharging of a square battery which belongs to charging and discharging equipment of the lithium-ion battery

BACKGROUND ART

Charging and discharging are an important process of the formation of lithium-ion battery. In the charging and discharging process, a pressing mechanism is generally used, the pressing mechanism comprises a bottom frame and a top frame, which can be opened and closed oppositely, the bottom frame and the top frame are both horizontally arranged, and the bottom frame is located below the top frame. A restraining tray is arranged on the bottom frame, clapboards are arranged on the restraining tray in a queue mode, and an accommodating space for the lithium-ion battery is formed in the space between each two adjacent clapboards. During charging and discharging process, the lithium-ion battery is arranged in the accommodating space between the clapboards to form a queue. The probes are arranged on the top frame in a queue, and the queue of probe is located above the queue of lithium-ion battery. When the top frame and the bottom frame are oppositely closed, the probe makes contact with the tab of the lithium-ion battery for charging and discharging.

In order to stably and reliably charge and discharge the lithium-ion battery, attention should be paid to the stability degree of pressing between the tab of the battery and the probe, that is, the projecting position of the probe and the tab of lithium-ion battery in the vertical direction needs to be overlapped. If the probe deviates from the position of the tab of lithium-ion battery, the charging and discharging of the lithium-ion battery would be affected since the probe cannot effectively contact the tab of lithium-ion battery.

Theoretically, when the probe queue is directly opposite to the lithium battery queue, the lithium battery is opposite to the position of the corresponding probe. However, because of the deviations existing in thickness of the lithium battery, and the size deviations of the clapboards, and the thickness of battery swelling caused by charging and discharging, especially, the deviations described above would be accumulated in the queue of lithium-ion battery, so that the deviations among the lithium-ion batteries far away from the position reference point and the corresponding probe may be sufficient to influence the effect of charging and discharging of the lithium-ion battery.

The existing pressing mechanism can only directly lift and press, the deviations described above cannot be calibrated, so that the uniformity and quality of the lithium-ion battery are influenced.

SUMMARY OF THE INVENTION

In order to solve the problems described above, the present invention provides a pressing mechanism with variable distance position and equal dividing for charging and discharging of the square battery, eliminating the accumulated size deviations caused by the thickness deviation of lithium-ion battery swelling by grouping and positioning the probe to improve the uniformity and quality of the lithium-ion battery by improving the stability of the charging and discharging.

The technical scheme adopted by the invention is as follows:

A pressing mechanism with variable distance position and equal dividing for charging and discharging of the square battery, comprises:

A frame comprises a top frame and a bottom frame which are horizontally arranged, the bottom frame is located below the top frame, the top frame and the bottom frame are arranged at intervals and fixedly connected through a plurality of guide rods;

A pressing unit arranged between the top frame and the bottom frame comprises a lifting saddle, a lifting driving cylinder and a plurality of restraining trays, and the lifting saddle horizontally arranged between the top frame and the bottom frame is slidably connected with the guide rod; a rectangular restraining tray placing frame is arranged at the lifting saddle, while the extending direction of the long edge of the restraining tray placing frame being defined as the left-right direction, the extending direction of the short edge of the restraining tray placing frame being defined as the front-rear direction, and a plurality of restraining tray holders are abreast arranged at the restraining tray placing frame in the left-right direction; the lifting terminal of the lifting driving cylinder arranged on the top frame is jointed with the restraining tray placing frame; a queue composed of a plurality of vertical clapboards which are perpendicular to the horizontal plane and parallel to each other is arranged in the restraining tray detachably mounted at the restraining tray holder; the longitudinal axis of the queue of the vertical clapboard is along the front-rear direction; wherein between each two adjacent vertical clapboard an accommodating space for the lithium-ion battery is reserved, and the vertical clapboards are flexibly linked; wherein:

A cam is arranged at the rear part of each restraining tray holder of which a rotation shaft is arranged along the left-right direction;

A variable distance position and equal dividing probe assembly arranged at the bottom of the top frame, comprises: a plurality of probe modules which are in one-to-one correspondence with the restraining tray holders, wherein, the probe module comprises a probe module frame, a linear sliding rail holder, a linear sliding rail, a reset unit, a wire connector and a plurality of probe units; the probe module frame is mounted right above the restraining tray holder, and the wire connector is arranged at the rear terminal of the probe module frame; a linear sliding rail is arranged along the front-back direction on the lower surface of the linear sliding rail holder coupled with the bottom of the probe module frame, and a plurality of the probe unit are slidably arranged on the linear sliding rail and aligned along the front-rear direction, and each of probe unit is coupled with the linear sliding rail holder through a reset tension spring; a positioning stick used for inserting into the accommodating space and a plurality of probes used for contacting the tab of lithium-ion batteries are arranged at the bottom of the probe unit, and the probe is electrically connected with the wire connector through a wire;

The reset unit comprises a cam contact block and a horizontal driving unit coupled with the front terminal of the cam contact block and arranged at the rear terminal of the linear sliding rail holder; a wedge-shaped driving surface and a vertical surface matching with the cam are arranged on the cam contact block from bottom to top wherein the vertical surface is jointed with the top of the wedge-shaped driving surface, and the cam is arranged in front of the wedge-shaped driving surface which is gradually inclined towards the cam from bottom to top, wherein the cam contact block is pushed backwards from the first position to the second position when the cam is upward rolling on the wedge-shaped driving surface; the horizontal driving unit is arranged between the cam contact block and the rearmost vertical clapboard, and the horizontal driving unit is used to drive the queue of vertical clapboard to move backwards; in the first position, the cam is in contact with the bottom of the wedge-shaped driving surface while the positioning stick is separated from the vertical clapboard; in the second position, the vertical surface is pressed by the cam while the rear adjacent vertical clapboard is tightly pressed by the positioning stick, which provides a position reference along the front-back direction for the probe on the probe unit.

Preferably, the probe unit comprises a sliding block, a probe, a positioning stick, a mounting block and a reset tension spring, wherein the sliding block is arranged at the terminal of the mounting block, and the mounting block is slidably mounted on the linear sliding rail through the sliding block; a plurality of probe and the positioning stick are arranged at the bottom of the mounted block; the reset tension spring is arranged between the mounting block and the linear sliding rail holder.

Furthermore, the probe unit further comprises a temperature sensor which is arranged in the mounting block in a penetrating mode, and the detection terminal of the temperature sensor is flush with that of the probe which is used for detecting the temperature of the surface of the lithium-ion battery.

Preferably, the cam contact block is U-shaped and is arranged in the rear of the linear sliding rail holder, and a wedge-shaped driving surface and a vertical surface are arranged at the front surface of the cam contact block; the horizontal driving unit comprises a driving block and a fixed block which is connected with the rear terminal of the linear sliding rail holder, and a second linear bearing is arranged in the fixed block in a penetrating mode, and a compression spring is arranged between the driving block and the fixed block; and a plain shaft is arranged in the second linear bearing in a penetrating mode, the front terminal of which is connected with the driving block, and the rear terminal of which is connected with the cam contact block, and the compression spring is arranged between the driving block and the fixed block, the driving block is leaned against the rear terminal of the probe unit.

Preferably, the restraining tray holder is a rectangular area defined by four L-shaped guide block; an anti-reverse pin is arranged on the rear part of the rectangular area, a position pin is arranged on the front part of the rectangular area while a position sensor is arranged in the rectangular area, which are used to estimate whether the restraining tray is correctly placed or not; a first linear bearing used for penetrating the guide rod and a limiting rod used for limiting the vertical height of the restraining tray placing frame are arranged on the frame edge of the restraining tray placing frame.

Preferably, the cam is arranged on a supporting rod, and the bottom of which is arranged at the rear part of the restraining tray placing frame; the cam is rotatably mounted at the top of the supporting rod through a rotation shaft which is arranged along the left-right direction of the restraining tray placing frame.

Preferably, the restraining tray comprises vertical clapboards, a restraining block, a restraining tray bottom plate, a front plate and a rear plate, and the front plate and the rear plate are arranged at the two terminals of the restraining tray bottom plate respectively, and the front plate and the rear plate are linked by a linkage shaft and a guide shaft; and a queue of the vertical clapboards is slidably arranged on the guide shaft in the front-rear direction; and a restraining block is detachably arranged between the front plate and the foremost vertical clapboard and between the rear plate and the rearmost vertical clapboard respectively to adjust the size of the accommodating space between the vertical clapboards.

Preferably, a contact sensor is arranged at the bottom of the restraining tray bottom plate, and the contact sensor is in contact with the position sensor when the restraining tray is installed in place.

Preferably, the position holes cooperated with the anti-reverse pin and the position holes cooperated with the position pin are respectively arrange at the rear part and the front part of the restraining tray bottom plate to realize the positioning of the restraining tray.

The method for charging and discharging the battery by using a pressing mechanism with variable distance position and equal dividing for charging and discharging of the square battery of the invention, comprises:

1) Placing the restraining tray to the corresponding restraining tray holder in the restraining tray placing frame in parallel while guiding the restraining tray through the L-shaped guide block, and estimating whether the restraining tray is correctly placed by the position pin, the anti-reverse pin, the contact sensor and the position sensor;

2) After the restraining tray is placed in the position, the restraining tray placing frame is driven to ascend by the lifting driving cylinder to fit the cam contact block and the probe unit in the first position, wherein the cam is in contact with the bottom of the cam contact block of the reset unit, meanwhile the positioning stick is located between the two adjacent vertical clapboards without contact with the front and rear one of that; while the driving block is pushed forward by the elastic force of the compression spring to drive the probe unit moving forward on the linear sliding rail meanwhile the reset tension spring is stretching to generate backward pulling force on the probe unit until the elastic force of the compression spring is balanced by the pulling force of the reset tension spring;

3) While the restraining placing frame is continually driven to ascend by the lifting driving cylinder, the cam rolls from bottom to top along the wedge-shaped driving surface of the cam contact block causing the cam contact block being pressed backwards to drive the driving block and press the compression spring simultaneously, which makes the balance between the elastic force of the compression spring and the pulling force the reset tension spring be broken, and the probe unit be pulled by the reset tension spring to move backwards until the positioning stick is in contact with the corresponding rear clapboard, that's to say the probe unit is located in-place and the cam contact block and the probe unit are located at the second position; wherein, the positioning stick of each probe unit provides the position reference along front-rear direction for its corresponding probe on the probe unit, and due to the fact that the probe unit contains a small amount of the probes, the accumulated size deviation of the lithium-ion battery and the vertical clapboards can be ignored so that the probe is aligned with the tab of the corresponding lithium-ion battery;

4) The restraining placing frame is continually driven to ascend by the lifting driving cylinder, until the limiting rod reaches a preset position, the lifting driving cylinder stops, and the probe is in contact with the tab of the battery right below performing a charging and discharging process;

5) After the charging and discharging process is completed, the restraining tray placing frame is driven to descend by the lifting driving cylinder; the cam rolls from top to bottom along a wedge-shaped driving surface of the cam contact block causing that the cam contact block being returned to the first position by the action of the cam and the compression spring, and the probe unit being returned to the first position along the linear sliding rail by the action of the reset tension spring, and the positioning stick being located in the middle of each two adjacent vertical clapboards without in contact with the front and rear vertical clapboards;

6) The restraining tray placing frame is continually driven to descend by the lifting driving cylinder until the restraining tray placing frame reaches the lowest position, and the whole process is completed.

The beneficial effects of the present invention are embodied in: 1, Reducing the coverage range of the position reference of the queue of lithium-ion battery and the probe unit from the whole queue to the length of one probe unit by positioning and equal dividing of the probe unit to reduce the accumulated deviation of thickness caused by battery swelling to mutually align the probes and the tabs of the lithium-ion battery for better contact, and therefore improving the uniformity and quality of the lithium-ion battery; 2, Improving the reliability of the mechanism since that the alignment action of the probe unit and the tab of lithium-ion battery is reliable.

BRIEF DESCRIPTION OF THE DRAWINGS

FIG. 7b is an enlarged view of the A of FIG. 7a.

FIG. 7c is an enlarged view of the B of FIG. 7a.

FIG. 8b is an enlarged view of the A of FIG. 8a.

FIG. 8c is an enlarged view of the B of FIG. 8a.

FIG. 9b is an enlarged view of the A of FIG. 9a.

FIG. 9c is an enlarged view of the B of FIG. 9a.

Figure 1:
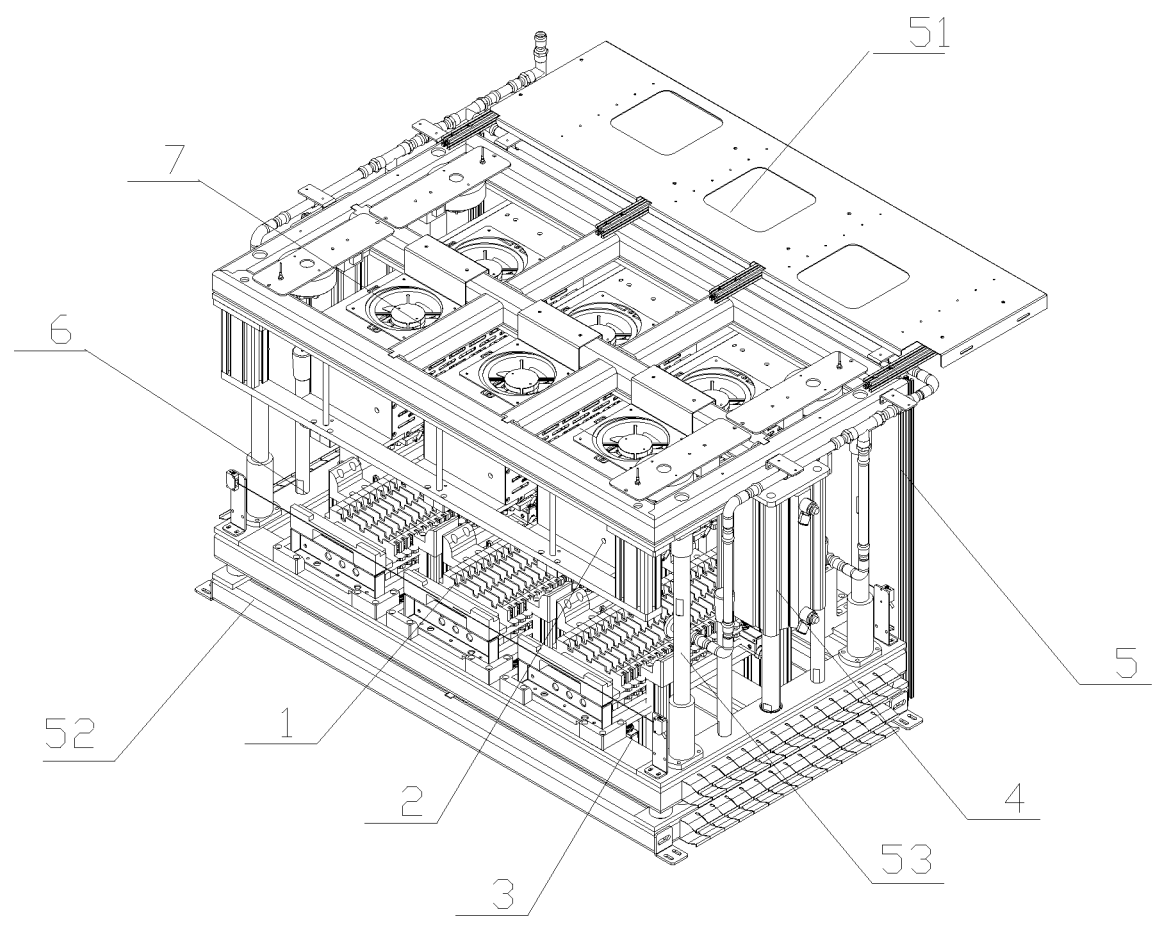
FIG. 1 is a structural diagram of the present invention.
Figure 2:
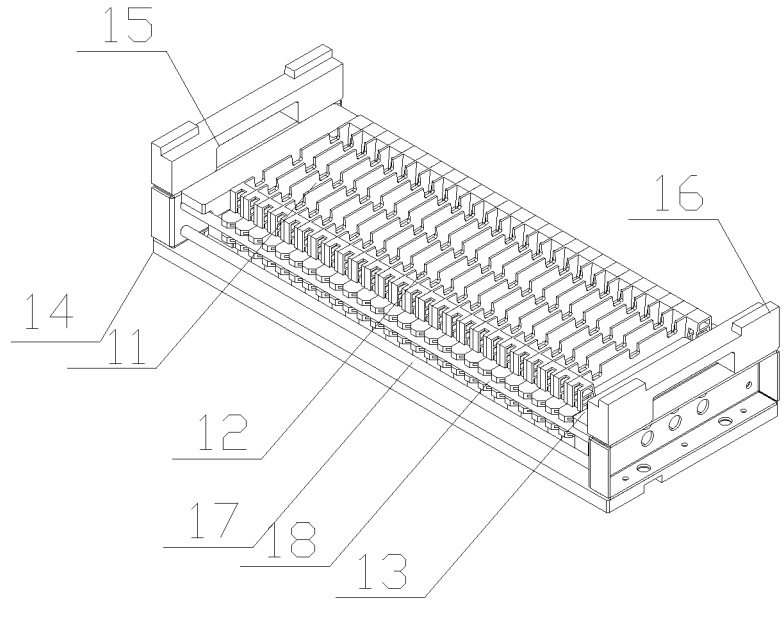
FIG. 2 is a structural diagram of the restraining tray of the present invention.

The reference signs of the drawings: 1. restraining tray; 11. vertical clapboard; 12. lithium-ion battery; 13. restraining block; 14. restraining tray bottom plate; 15. front plate; 16. rear plate; 17. linkage shaft; 18. guide shaft; 2. probe module; 21. probe unit; 22. reset unit; 23. wire connector; 24. linear sliding rail; 25. linear sliding rail; 26. linear sliding rail holder; 27. probe module frame; 211. sliding block; 212. probe; 213. positioning stick; 214. mounting block; 215. reset tension spring; 216. temperature sensor; 217. wire; 220. horizontal driving unit; 221. cam contact block; 222. second linear bearing; 223. driving block; 224. compression spring; 225. plain shaft; 226. fixed block; 2211. wedge-shaped driving surface; 2212. vertical surface; 3. lifting saddle; 31. restraining tray placing frame; 301. supporting rod; 311. restraining tray holder; 312. first linear bearing; 32. L-shaped guide block; 33. position pin; 34. anti-reverse pin; 35. position sensor; 36. cam; 37. limiting rod 361. rotation shaft; 4. lifting driving cylinder; 5. frame; 51. top frame; 52. bottom frame; 53. guide rod; 6. pressing unit; 7. variable distance position and equal dividing probe assembly.

Specific Embodiments

Specific embodiments of the present invention are described in detail below with reference to the accompanying drawings. It should be understood that the specific embodiments described herein are merely used to illustrate and explain the embodiments of the present invention and are not intended to limit the embodiments of the present invention.

It should be noted that, in the case of no conflict, the embodiments in the present invention and the features in the embodiments may be combined with each other.

In the description of the present invention, it should be understood that the orientation or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", or the like are based on the orientation or positional relationship shown in the drawings, and the terms are intended only to facilitate and simplify the description of the present invention, rather than indicating or implying that the indicated device or element must have a specific orientation, or constructed and operated in a specific orientation, and therefore cannot be understood as a limitation to the present invention.

In addition, the terms "first" and "second" are used for description only and cannot be understood as indicating or implying relative importance or implicitly indicating the number of technical features. Thus, the features defined with "first" and "second" may explicitly or implicitly include at least one of the features. In the description of the present invention, the meaning of "a plurality of" is at least two, for example, two, three, etc., unless specifically defined otherwise.

In the present invention, terms such as "mounted", "connected", "jointed", "linked" "fixed" and the like should be construed broadly unless expressly specified and defined, for example, may be fixedly connected, or may be detachably connected, or integrated; may be mechanically connected or electrically connected with each other or may communicate with each other; may be directly connected or indirectly connected through an intermediate medium, and may be communicated with the interiors of the two elements or the interaction relation of the two elements unless explicitly defined otherwise. For a person of ordinary skill in the art, the specific meaning of the term in the present invention may be understood according to specific conditions.

In the present invention, unless expressly specified and defined otherwise, the first feature is "upper" or "lower" the second feature, which may be the first and second features are directly contacted, or the first and second features are in indirect contact through the intermediate medium. Moreover, the first feature is "above", "upward" and "upper" the second feature, which may be that the first feature is directly above or obliquely above the second feature, or merely indicates that the level height of the first feature is greater than the second feature. The first feature is "below", "downward" or "under" the second feature, and "below", "downward" and "under" may be that the first feature is directly below or obliquely below the second feature, or merely indicates that the level height of the first feature is less than the second feature.

In this specification, the description of reference terms of "an embodiment," "some embodiments," "an example," "a specific example," or "some examples" means that the particular feature, structure, material, or characteristic described in connection with the embodiment or example is included in at least one embodiment or example of the present invention. In this specification, the schematic representation of the above terms does not have to be directed to the same embodiment or example. Furthermore, the particular features, structures, materials, or characteristics described may be combined in any suitable manner in any one or more embodiments or examples. In addition, a person skilled in the art can integrate and integrate different embodiments or examples and features of different embodiments or examples described in this specification without contradiction.

The present invention will be described in detail below with reference to the drawings and in conjunction with exemplary embodiments.

As shown in FIG. 1 to FIG. 6, a pressing mechanism with variable distance position and equal dividing for charging and discharging of the square battery, comprises:

A frame 5 comprises a top frame 51 and a bottom frame 52 which are horizontally arranged, the bottom frame 52 is located below the top frame 51, the top frame 51 and the bottom frame 52 are arranged at intervals and fixedly connected through a plurality of guide rods 53;

A pressing unit 6 arranged between the top frame 51 and the bottom frame 52 and comprises a lifting saddle 3, a lifting driving cylinder 4 and a plurality of restraining tray 1, and the lifting saddle 3 horizontally arranged between the top frame 51 and the bottom frame 52 is slidably sleeved the guide rod 53; a rectangular restraining tray placing frame 31 is arranged at the lifting saddle 3 and the restraining tray placing frame 31 is used for supporting and locating the tray, while the extending direction of the long edge of the restraining tray placing frame 31 being defined as the left-right direction, the extending direction of the short edge of the restraining tray placing frame 31 being defined as the front-rear direction, and three restraining tray holder 311 are abreast arranged at the restraining tray placing frame 31 in the left-right direction; the lifting terminal of the lifting driving cylinder 4 arranged on the top frame 51 is jointed with the restraining tray placing frame 31; a queue composed of a plurality of vertical clapboard 11 which is perpendicular to the horizontal plane and parallel to each other is arranged in the restraining tray 1 detachably mounted at the restraining tray holder 311; the longitudinal axis of the queue of the vertical clapboard 11 is along the front-rear direction; wherein between each two adjacent vertical clapboards 11 an accommodating space for the lithium-ion battery 12 is reserved, and the vertical clapboards are flexibly linked.

A cam 36 is arranged at the rear part of each restraining tray holder 311 of which a rotation shaft 361 is arranged along the left-right direction;

A variable distance position and equal dividing probe assembly 7 arranged at the bottom of the top frame 51 comprises: a plurality of probe modules 2 which are in one-to-one correspondence with the restraining tray holders 311, and each probe module 2 comprises a probe module frame 27, a linear sliding rail holder 26, a linear sliding rail 24, a reset unit 22, a wire connector 23 and a plurality of probe units 21; the probe module frame 27 is mounted right above the restraining tray holder 311, and the wire connector 23 is arranged at the rear terminal of the probe module frame 27; a linear sliding rail 25 is arranged along the front-back direction on the lower surface of the linear sliding rail holder 26 coupled with the bottom of the probe module frame 27, and a plurality of the probe units 21 are slidably arranged on the linear sliding rail 25 and aligned along the front-rear direction, and each of the probe unit 21 is coupled with the linear sliding rail holder 26 through the reset tension springs 215, which is able to stretch and reset of the probe unit 21; a positioning stick 213 used for inserting into the accommodating space and a plurality of probe 212 used for contacting the battery tab are arranged at the bottom of the probe unit 21; and the probe 212 is electrically connected with the wire connector 23 through a wire 217;

The reset unit 22 comprises a cam contact block 221 and a horizontal driving unit 220 coupled with the front terminal of the cam contact block 221 and arranged at the rear terminal of the linear sliding rail holder 26; a wedge-shaped driving surface 2211 and a vertical surface 2212 matching with the cam 36 are arranged on the cam contact block 221 from bottom to top, wherein the vertical surface 2212 is jointed with the top of the wedge-shaped driving surface 2211, and the cam 36 is arranged in front of the wedge-shaped driving surface 2211 which is gradually inclined towards the cam 36 from bottom to top, wherein the cam contact block 221 is pushed backwards from the first position to the second position when the cam 36 is upward rolling on the wedge-shaped driving surface 2211; the horizontal driving unit 220 is arranged between the cam contact block 221 and the rearmost vertical clapboard 11, and the horizontal driving unit 220 is used to drive the queue of vertical clapboard to move backwards; in the first position, the cam 36 is in contact with the bottom of the wedge-shaped driving surface 2211 while the positioning stick 213 is separated from the vertical clapboard 11; in the second position, the cam 36 is pressed on the vertical surface 2212, while the rear adjacent vertical clapboard 11 is tightly pressed by the positioning stick 213, which provides a position reference along the front-back direction for the probe 212 on the probe unit 21.

In some embodiments of the invention, the probe unit 21 comprises a sliding block 211, a probe 212, a positioning stick 213, a mounting block 214 and a reset tension spring 215, wherein the sliding block 211 is arranged at the terminal of the mounting block 214, and the mounting block 214 is slidably mounted on the linear sliding rail 25 through the sliding block 211; a plurality of probe 212 and the positioning stick 213 are arranged at the bottom of the mounted block 214; the reset tension spring 215 is arranged between the mounting block 214 and the linear sliding rail holder 26, one terminal of the reset tension spring 215 is connected with the terminal of the mounting block 214, and the other terminal of the reset tension spring 215 is connected with the linear sliding rail holder 26.

Figure 4:
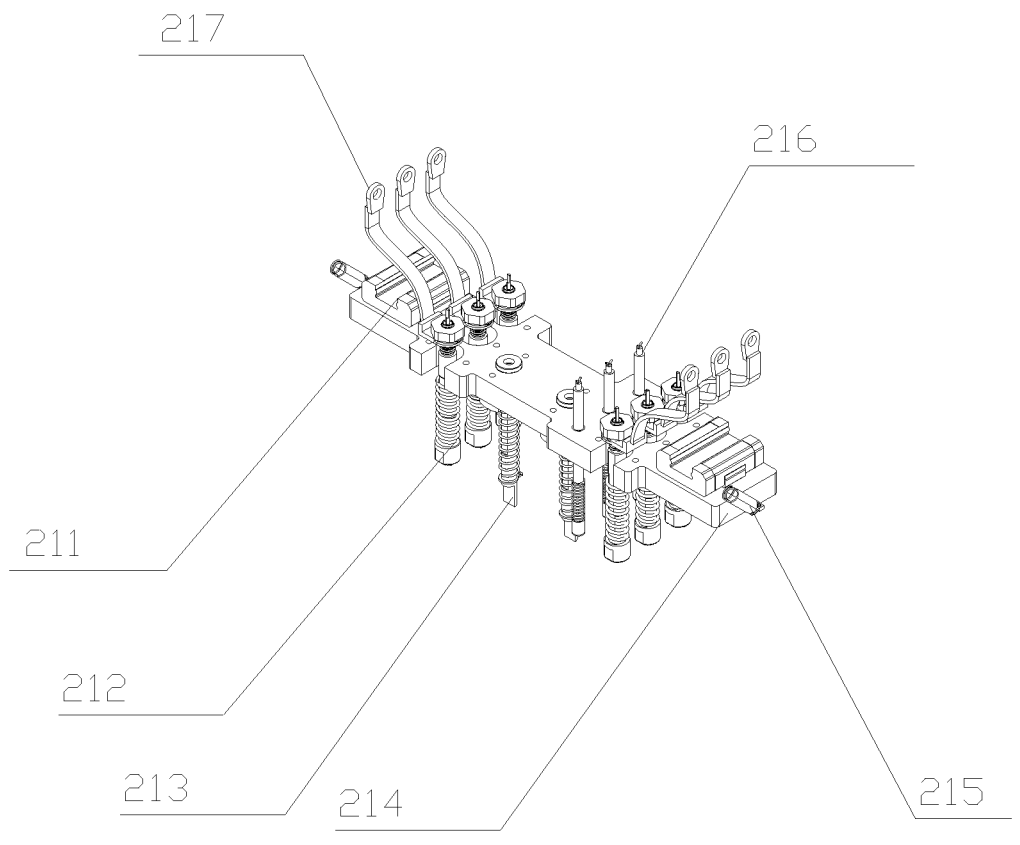
FIG. 4 is a structural diagram of the probe unit of the present invention.

As shown in FIG. 4, the probe unit 21 further comprises a temperature sensor 216 which is arranged in the mounting block 214 in a penetrating mode, and the detection terminal of the temperature sensor 216 is flush with that of the probe 212 which is used for detecting the temperature of the surface of the lithium-ion battery.

Figure 3:
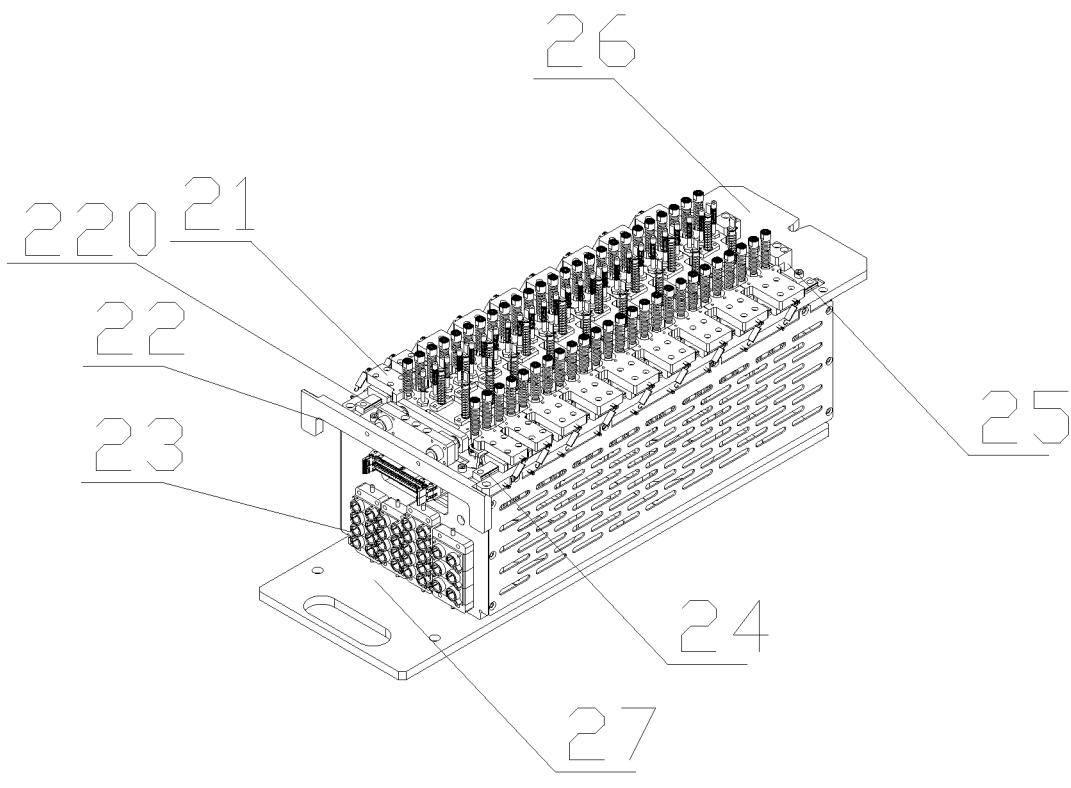
FIG. 3 is a structural diagram of the variable distance position and equal dividing probe assembly of the present invention.
Figure 3A:
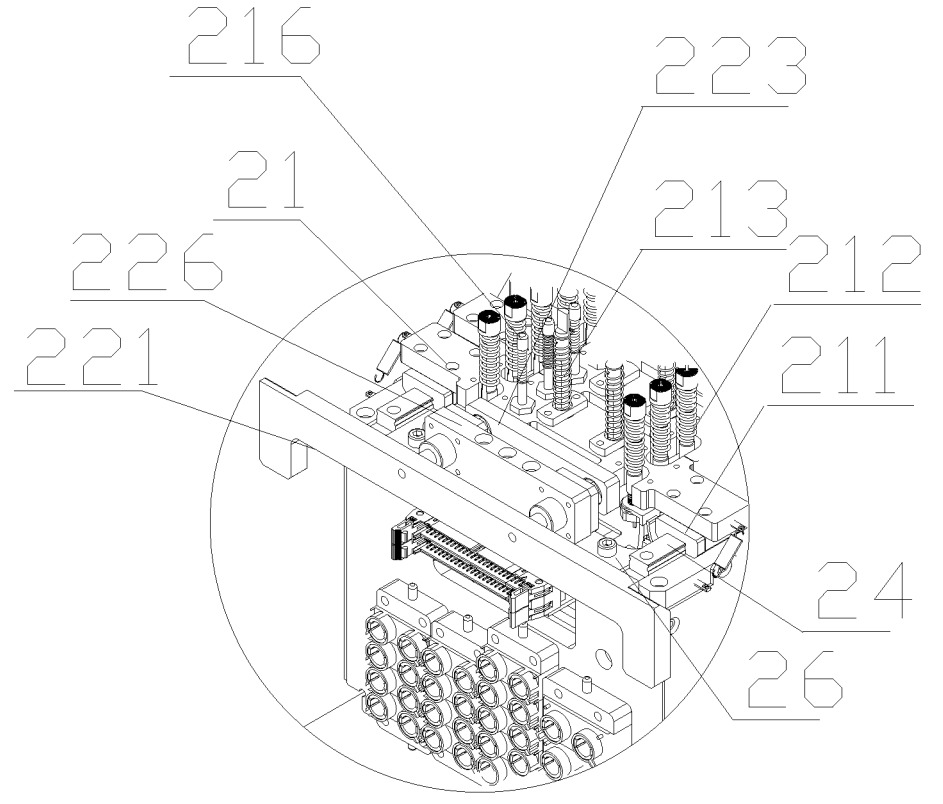
FIG. 3a is a schematic diagram of a connection relationship between the fixed block of the horizontal driving unit and the linear sliding rail holder of the present invention.
Figure 5:
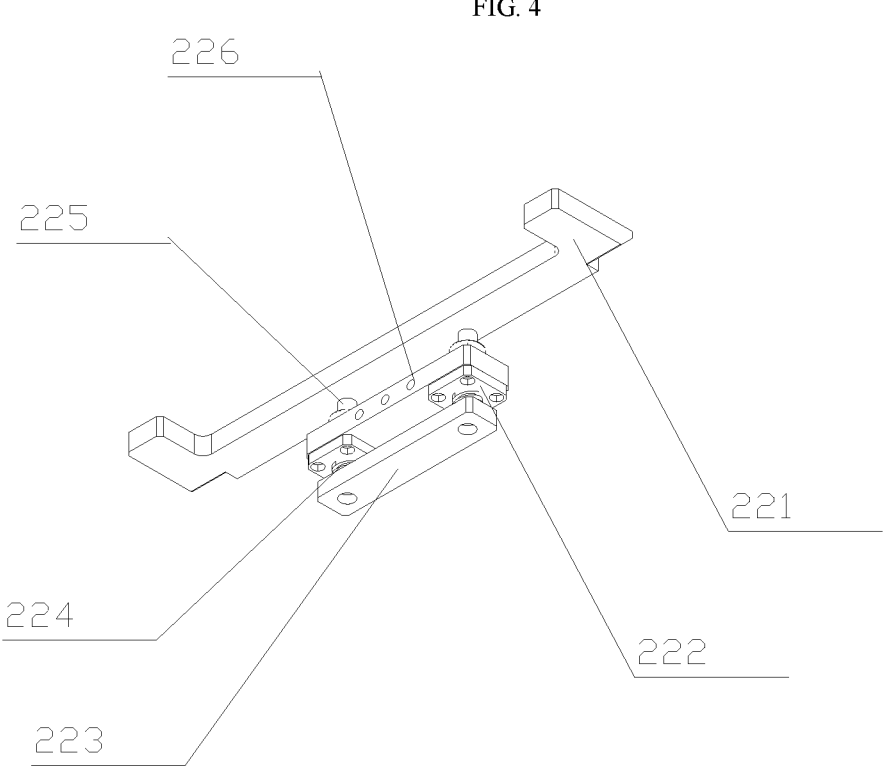
FIG. 5 is a structural diagram of the reset unit of the present invention.
Figure 5A:
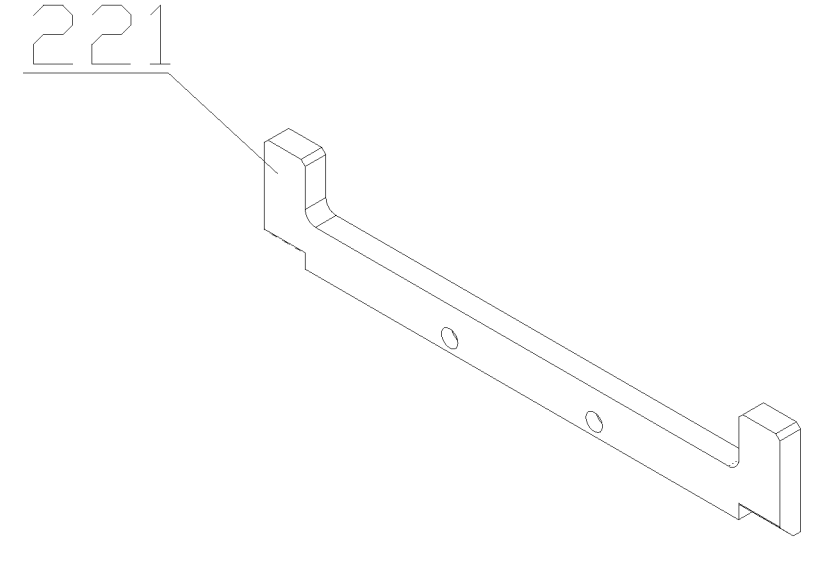
FIG. 5a is a structural diagram of the cam contact block of the present invention.
Figure 5B:
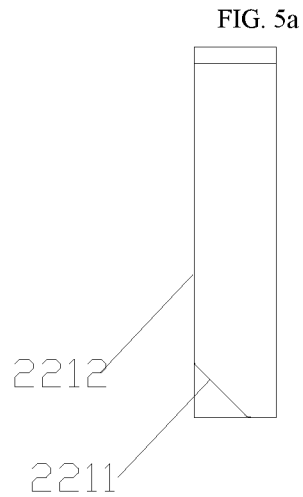
FIG. 5b is a side view of the cam contact block of the present invention.
Figure 5C:
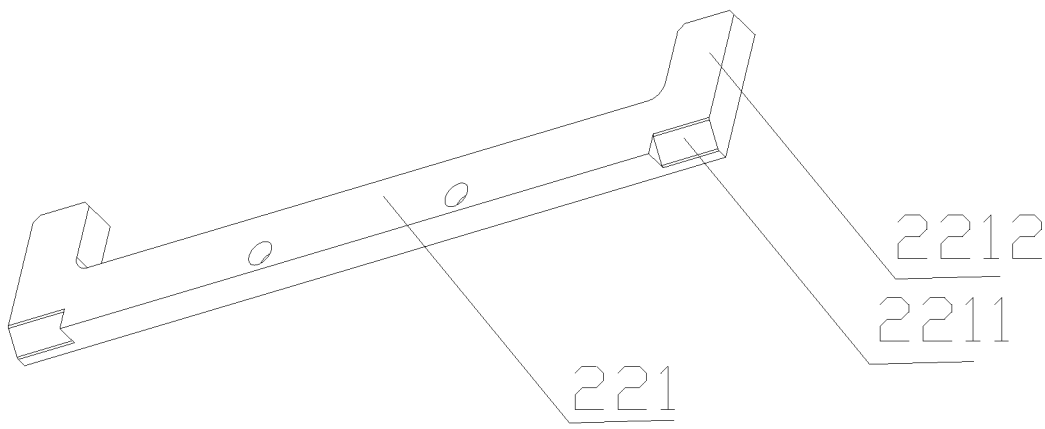
FIG. 5c is a bottom perspective view of the cam contact block of the present invention.

As shown in FIG. 3 and FIG. 5, the cam contact block 221 is U-shaped and is arranged in the rear of the linear sliding rail holder 26, and the wedge-shaped driving surface 2211 and the vertical surface 2212 are arranged at the front surface of the cam contact block 221; the horizontal driving unit comprises a driving block 223 and a fixed block 226 which is connected with the rear terminal of the linear sliding rail holder 26, and a second linear bearing 222 is arranged in the fixed block 226 in a penetrating mode; and a plain shaft 225 is arranged in the second linear bearing 222 in a penetrating mode, the front terminal of which is connected with the driving block 223, and the rear terminal of which is connected with the cam contact block 221, and the compression spring 224 is arranged on the plain shaft 225 which is between the driving block 223 and the fixed block 226 in a sleeving mode.

Figure 6:
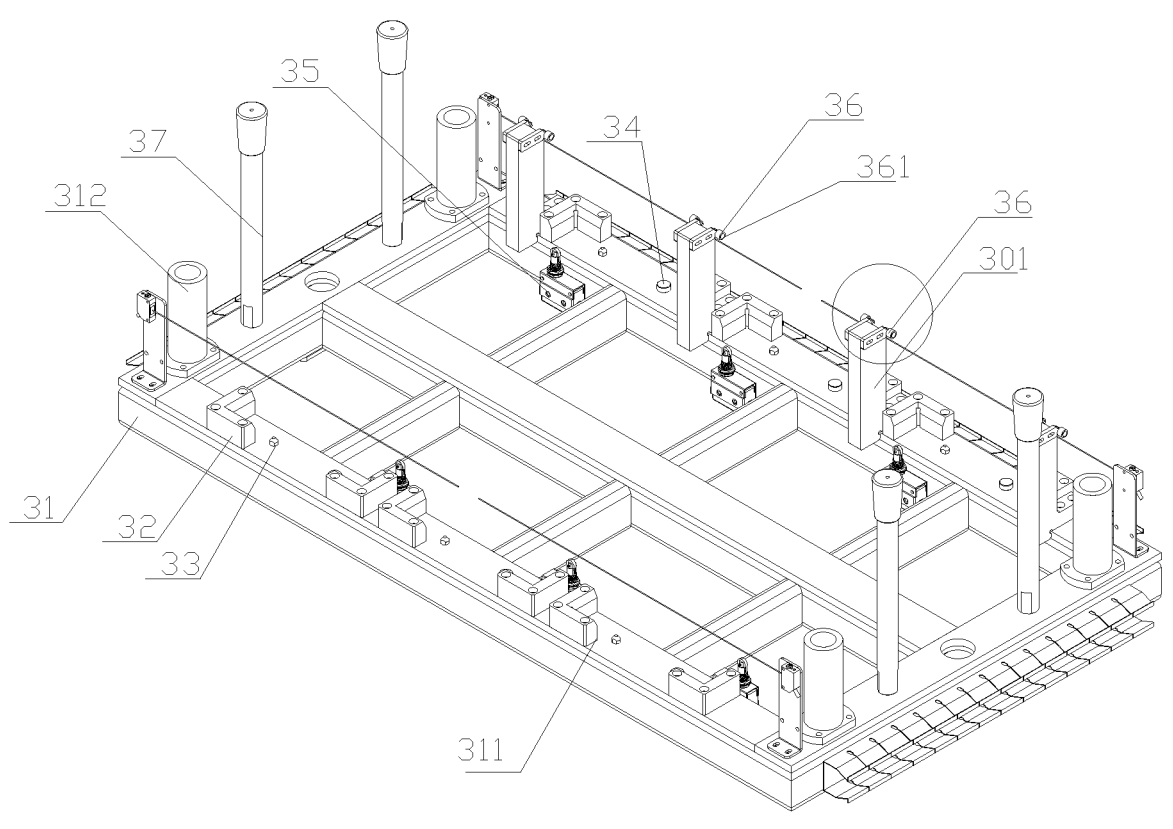
FIG. 6 is a structural diagram of the lifting saddle of the present invention.
Figure 6A:
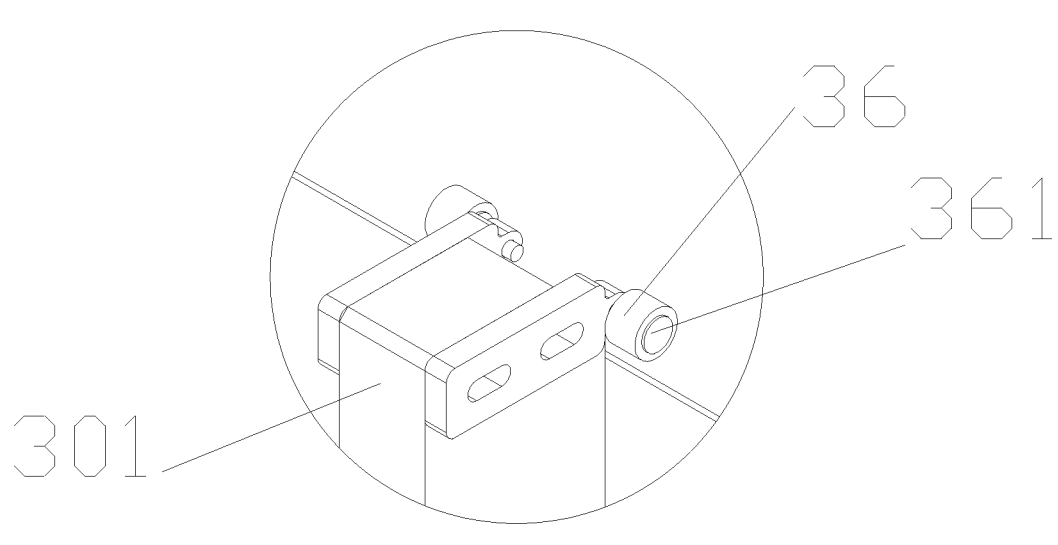
FIG. 6a is a partial enlarged view of FIG. 6.
Figure 7A:
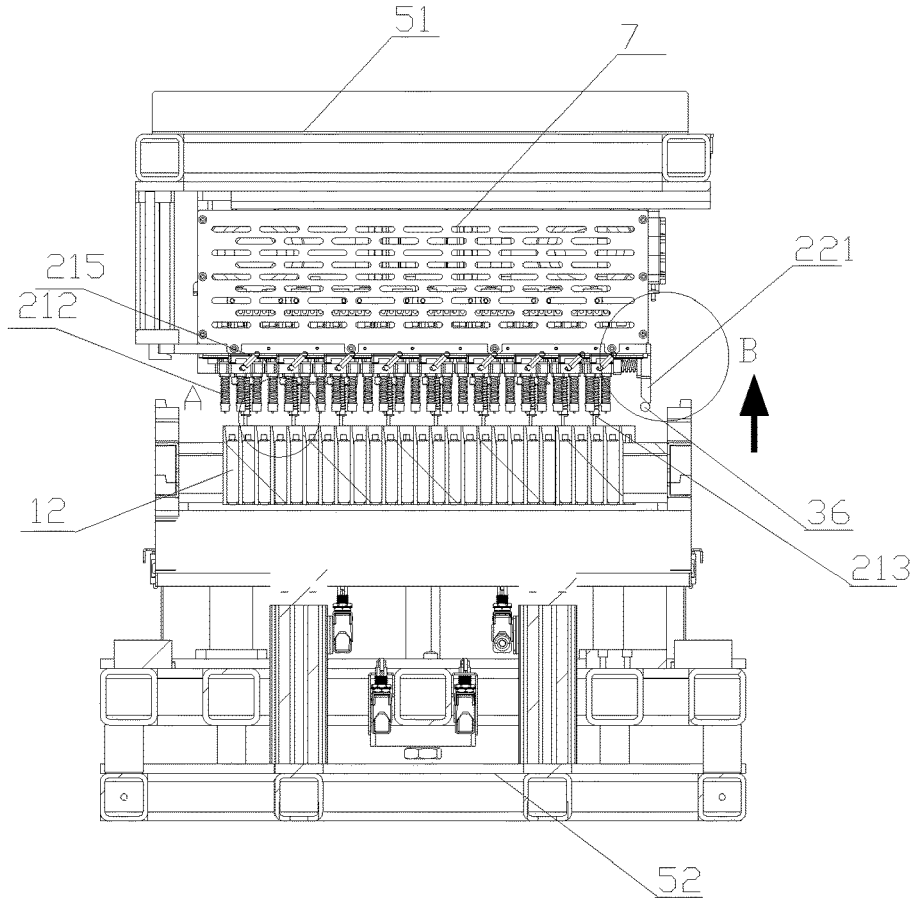
FIG. 7a is a working schematic diagram of the cam and the cam contact block in the first position of the present invention.
Figure 7B:
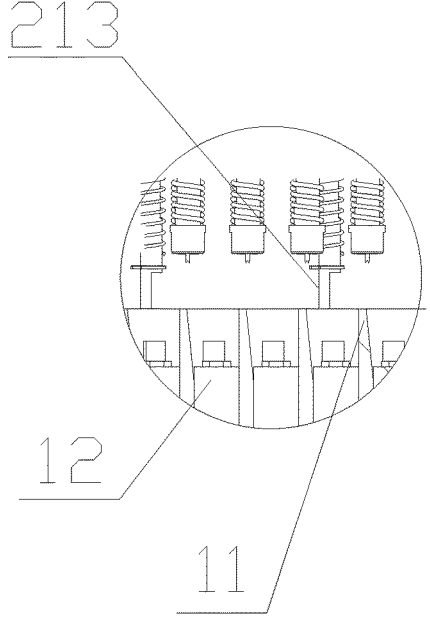
Figure 7C:
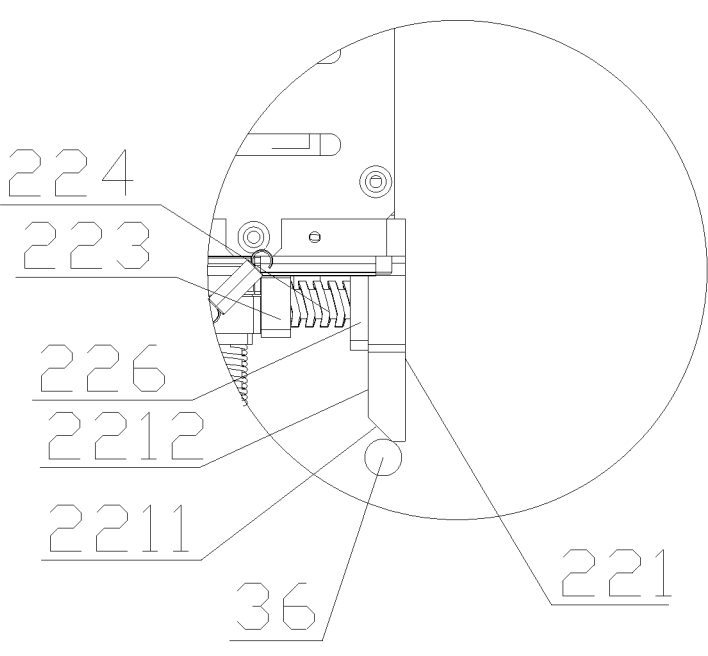
Figure 8A:
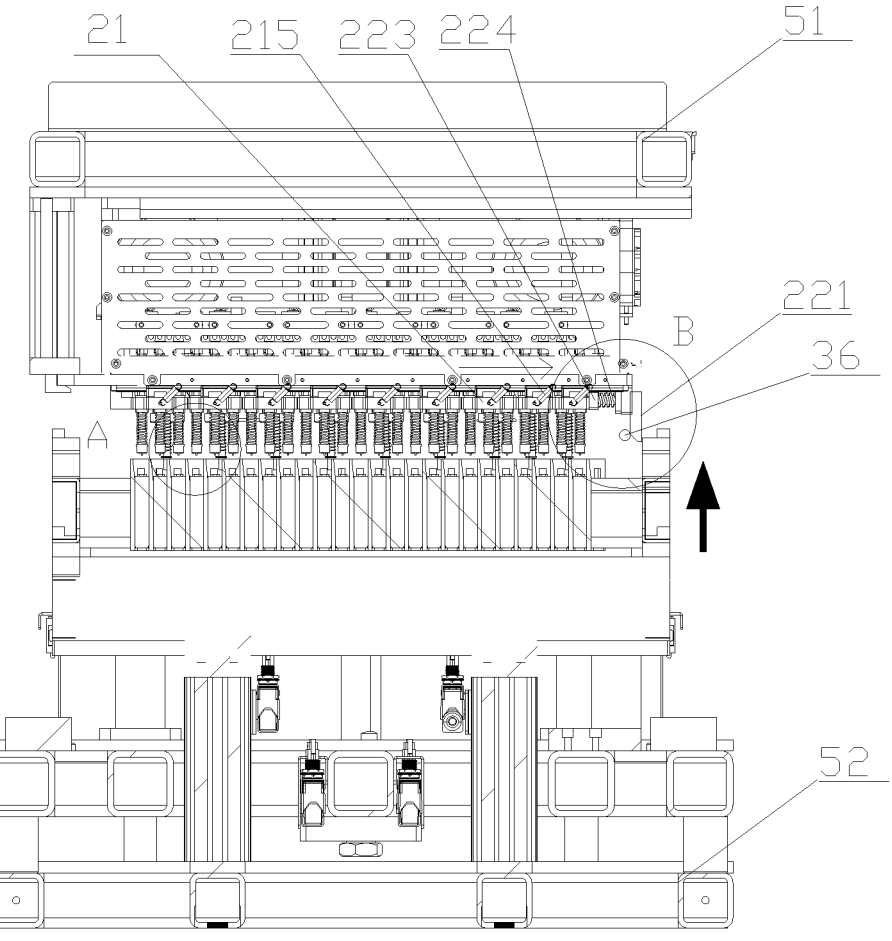
FIG. 8a is a working schematic diagram of the positioning operation of the cam and the cam contact block of the present invention.
Figures 8B, 8C:
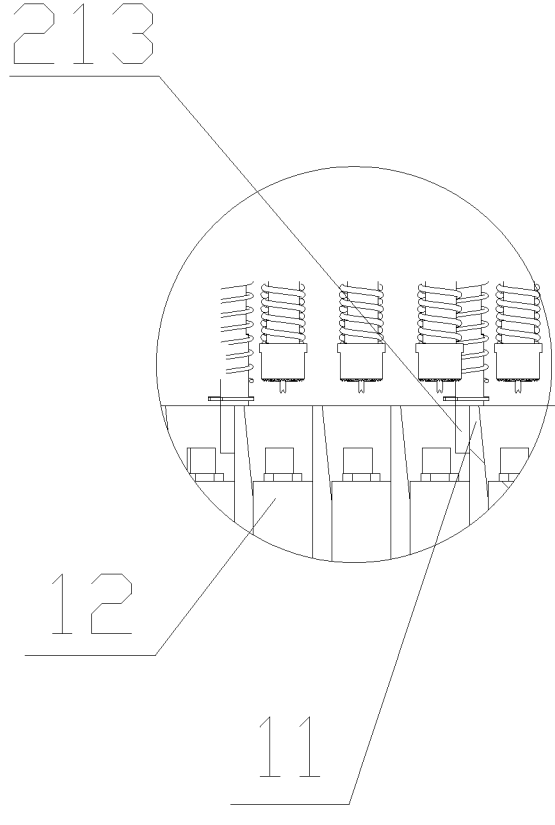
Figure 9A:
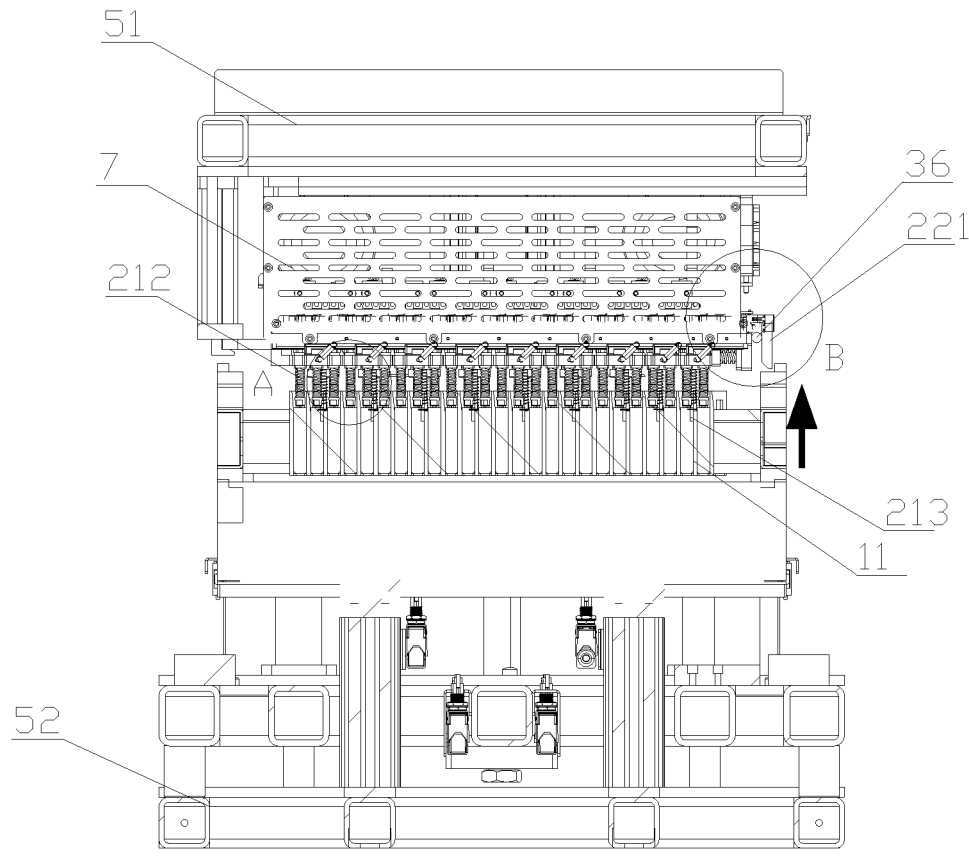
FIG. 9a is a working schematic diagram of the cam and the cam contact block in the second position of the present invention.
Figure 9B:
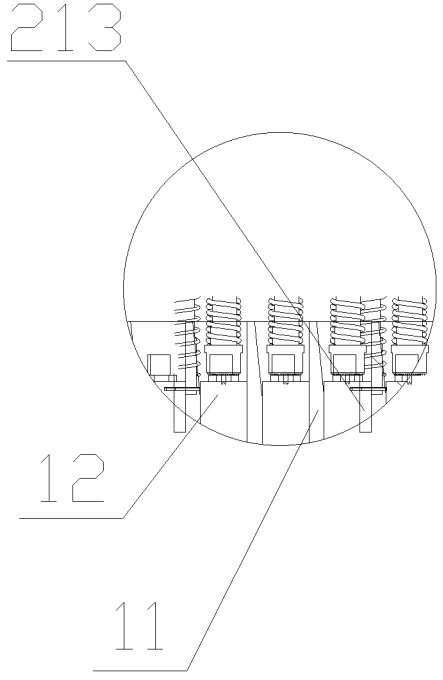
Figure 9C:
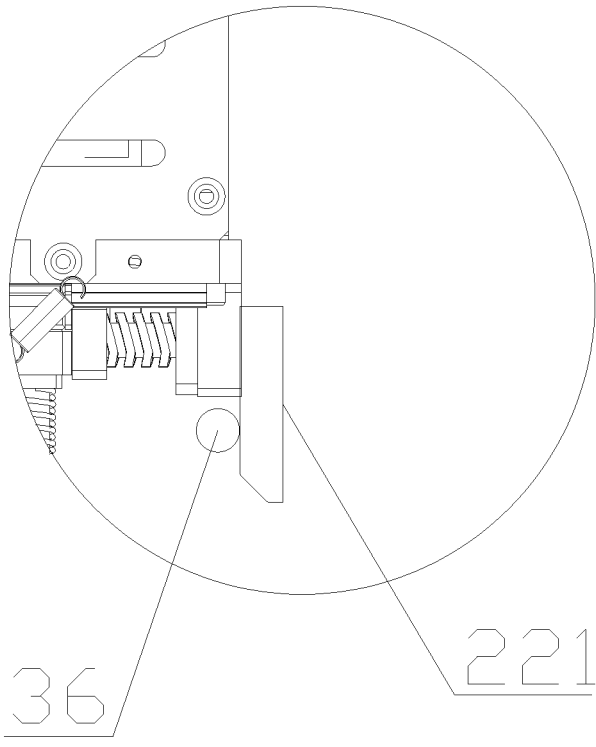

As shown in FIG. 6, the cam 36 is arranged on a supporting rod 301, and the bottom of which is arranged at the rear part of the restraining tray placing frame 31; the cam 36 is rotatably mounted at the top of the supporting rod 301 through the rotation shaft 361 which is arranged along the left-right direction of the restraining tray placing frame 31.

As shown in FIG. 6, the top frame 51 and the bottom frame 52 are rectangular frames which are up and down parallelly opposite, and are fixed through four vertically-arranged guide rod 53.

As shown in FIG. 6, in the embodiment, the restraining tray holder 311 is a rectangular area defined by four L-shaped guide block 32, an anti-reverse pin 34 is arranged on the rear part of the rectangular area while a positioning pin 33 is arranged on the front part of the rectangular area, a position sensor 35 is arranged in the rectangular area, which are used to estimate whether the restraining tray 1 is correctly placed or not; a first linear bearing 312 used for penetrating the guide rod 53 and a limiting rod 37 used for limiting the vertical height of the restraining tray placing frame 31 are arranged on the frame edge of the restraining tray placing frame 31. In the ascending process of the lifting driving cylinder 4, the cam 36 is cooperated with the reset unit 22 installed at the rear part of the variable distance position and equal dividing probe assembly 7 to regulate and control the front-rear location of the positioning stick 213 on the probe unit 21, the positioning stick 213 of each probe unit 21 is provided the position reference along front-rear direction for the probe 212 on the probe unit 21, and due to the fact that the probe unit 21 contains a small amount of the probes, the accumulated size deviation of the lithium-ion battery and the vertical clapboard can be ignored so that the probe is aligned with the tab of the corresponding lithium-ion battery, and therefore the purpose of accurate positioning is achieved.

In some embodiments of the invention, the restraining tray 1 is located at the center of the whole machine, and the purpose of the tray is to place a plurality of lithium-ion batteries 12 and provide a certain restraining force to counteract the battery 12 swollen in the charging and discharging process, and the battery swollen in the charging process causes the change of the overall size, resulting in the deterioration of uniformity and the quality of the battery 12. The restraining tray 1 comprises a vertical clapboard 11, a restraining block 13, a restraining tray bottom plate 14, a front plate 15 and a rear plate 16, and the front plate 15 and the rear plate 16 are arranged at the two terminals of the restraining tray bottom plate 14 respectively, and the front plate 15 and the rear plate 16 are linked by a linkage shaft 17 and a guide shaft 18; and a queue of the vertical clapboards 11 is slidably arranged on the guide shaft 18 in the front-rear direction; in order to ensure the necessary flexibility of the vertical clapboard queue in the movement process, the vertical clapboards 11 are flexibly linked to allow a certain degree of relative displacement while being linked with each other, for example, linking the vertical clapboards 11 with slack ropes; a restraining block 13 is selectively arranged between the front plate 15 and the foremost vertical clapboard 11 or the rear plate 16 and the rearmost clapboard 11 as needed, to tightly press the lithium-ion batteries between the vertical clapboards 11, and the whole restraining tray does not need a power unit.

In some embodiments of the invention, a contact sensor is arranged at the bottom of the restraining tray bottom plate 14, and the contact sensor is in contact with the position sensor 35 when the restraining tray 1 is installed in place.

In some embodiments of the invention, position holes cooperated with the anti-reverse pin 34 and the position holes cooperated with the position pin 33 are respectively arrange at the rear part and the front part of the restraining tray bottom plate 14 to realize the positioning of the restraining tray 1.

The method for charging and discharging the battery by using a pressing mechanism with variable distance positioning and equal dividing for charging and discharging of the square battery of the invention, comprises:

1) Placing the restraining tray 1 to the corresponding restraining tray holder 311 in the restraining tray placing frame 31 in parallel while guiding the restraining tray 1 through the L-shaped guide block 32, and estimating whether the restraining tray 1 is correctly placed by the position pin 32, the anti-reverse pin 34, the contact sensor and the position sensor 35;

2) After the restraining tray 1 is placed in the position, the restraining tray placing frame 31 is driven to ascend by the lifting driving cylinder 4 to fit the cam contact block and the probe unit in the first position, wherein the cam 36 is in contact with the bottom of the cam contact block 221 of the reset unit 22, meanwhile the positioning stick 213 is located between the two adjacent vertical clapboards 11 without contact with the front and rear one of that, while the driving block is pushed forward by the elastic force of the compression spring 224 to drive the probe unit moving forward on the linear sliding rail, meanwhile the reset tension spring is stretching to generate backward pulling force on the probe unit until the elastic force of the compression spring 224 is balanced by the pulling force of the reset tension spring;

3) While the restraining placing frame 31 is continually driven to ascend by the lifting driving cylinder 4, the cam 36 rolls from bottom to top along the wedge-shaped driving surface 2211 of the cam contact block 221 causing the cam contact block 221 being pressed backwards to drive the driving block 223 and press the compression spring 224 simultaneously, which makes the balance between the elastic force of the compression spring 224 and the pulling force the reset tension spring 215 be broken, and the probe unit 21 be pulled by the reset tension spring to move backwards until the positioning stick 213 is in contact with the corresponding rear clapboard 11, that's to say the probe unit 21 is located in-place, and at the moment, the cam contact block 221 and the probe unit 21 are located at the second position; wherein, the positioning stick 213 of each probe unit 21 provides the position reference along front-rear direction for its corresponding probe 212 on the probe unit 21, and due to the fact that the probe unit 21 contains a small amount of the probes 212, the accumulated size deviation of the lithium-ion battery and the vertical clapboards 11 can be ignored so that the probe 212 is aligned with the tab of the corresponding lithium-ion battery.

4) The restraining placing frame 31 is continually driven to ascend by the lifting driving cylinder 4, until the limiting rod 37 reaches a preset position, the lifting driving cylinder 4 stops, and the probe 212 is in contact with the tab of the battery 12 right below performing a charging and discharging process;

5) After the charging and discharging process is completed, the restraining tray placing frame 31 is driven to descend by the lifting driving cylinder 4; the cam 36 rolls from top to bottom along a wedge-shaped driving surface 2211 of the cam contact block 221 causing that the cam contact block 221 being returned to the first position by the action of the cam 36 and the compression spring 224; the probe unit 21 is returning to the first position along the linear sliding rail 24 by the action of the reset tension spring 215, and the positioning stick 213 being located between the two adjacent vertical clapboards 11 without in contact with the front and rear vertical clapboards 11;

6) The restraining tray placing frame 31 is continually driven to descend by the lifting driving cylinder 4 until the restraining tray placing frame 31 reaches the lowest position, and the whole process is completed.

Although the embodiment of the invention has been shown and described above, it can be understood that the above-mentioned embodiments are exemplary and cannot be understood as limitations to the present invention, and a person of ordinary skill in the art can change, modify, replace and deform the above-mentioned embodiments within the scope of the present invention.

The invention claimed is:

1. A pressing mechanism with variable distance position and equal dividing for charging and discharging of a square battery, comprises:

a frame comprises a top frame and a bottom frame, both the top frame and the bottom frame being horizontally arranged, the bottom frame is located below the top frame, the top frame and the bottom frame are arranged at intervals and fixedly connected through a plurality of guide rods;

a pressing unit arranged between the top frame and the bottom frame comprises a lifting saddle, a lifting driving cylinder and a plurality of restraining trays, and the lifting saddle horizontally arranged between the top frame and the bottom frame is slidably connected with the plurality of guide rods; a rectangular restraining tray placing frame is arranged at the lifting saddle, while a extending direction of a long edge of the rectangular restraining tray placing frame being defined as a left-right direction, a extending direction of a short edge of the rectangular restraining tray placing frame being defined as a front-rear direction, and a plurality of restraining tray holders are abreast arranged at the rectangular restraining tray placing frame in the left-right direction; a lifting terminal of the lifting driving cylinder arranged on the top frame is jointed with the rectangular restraining tray placing frame; a queue composed of a plurality of vertical clapboards which are perpendicular to a horizontal plane and parallel to each other is arranged in each of the plurality of restraining trays; each of the plurality of the restraining trays is detachably mounted at each of the plurality of restraining tray holders; a longitudinal axis of the queue of the plurality of vertical clapboards is along the front-rear direction wherein between each two adjacent vertical clapboards of the plurality of vertical clapboards an accommodating space for a lithium-ion battery is reserved, and the plurality of vertical clapboards are flexibly linked; wherein:

a cam is arranged at a rear part of each restraining tray holder of the plurality of restraining tray holders; a rotation shaft is arranged along the left-right direction of the cam;

a variable distance position and equal dividing probe assembly arranged at a bottom of the top frame comprises: a plurality of probe modules which are in one-to-one correspondence with the plurality of restraining tray holders, wherein, each of the plurality of probe modules comprises a probe module frame, a linear sliding rail holder, a linear sliding rail, a reset unit, a wire connector and a plurality of probe units; the probe module frame is mounted right above the plurality of restraining tray holders, and the wire connector is arranged at a rear terminal of the probe module frame; the linear sliding rail is arranged along the front-rear direction on a lower surface of the linear sliding rail holder coupled with a bottom of the probe module frame, and a plurality of probe units are slidably arranged on the linear sliding rail and aligned along the front-rear direction, and each of the plurality of probe units is coupled with the linear sliding rail holder through a reset tension spring; a positioning stick used for inserting into the accommodating space and a plurality of probes used for contacting a tab of the lithium-ion battery are arranged at a bottom of each of the plurality of probe units, and the plurality of probes is electrically connected with the wire connector through a wire;

the reset unit comprises a cam contact block and a horizontal driving unit coupled with a front terminal of the cam contact block and arranged at a rear terminal of the linear sliding rail holder; a wedge-shaped driving surface and a vertical surface matching with the cam are arranged on the cam contact block from bottom to top wherein the vertical surface is jointed with a top of the wedge-shaped driving surface, and the cam is arranged in front of the wedge-shaped driving surface which is gradually inclined towards the cam from bottom to top, wherein the cam contact block is pushed backwards from a first position to a second position when the cam is upward rolling on the wedge-shaped driving surface; the horizontal driving unit is arranged between the cam contact block and a rearmost vertical clipboard of the plurality of vertical clapboard to drive the queue of vertical clapboards to move backwards; in the first position, the cam contacts with a bottom of the wedge-shaped driving surface while the positioning stick is separated from the plurality of vertical clapboard; in the second position, the vertical surface is pressed by the cam while a rear adjacent vertical clapboard of the plurality of vertical clapboards is tightly pressed by the positioning stick which provides a position reference along the front-back direction for the plurality of probes on the plurality of probe units.

2. The pressing mechanism with variable distance position and equal dividing for charging and discharging of the square battery according to claim 1, wherein each of the plurality of probe units comprises a sliding block, the plurality of probes, the positioning stick, a mounting block and the reset tension spring, wherein the sliding block is arranged at a terminal of the mounting block, and the mounting block is slidably mounted on the linear sliding rail through the sliding block; the plurality of probes and the positioning stick are arranged at a bottom of the mounting block; the reset tension spring is arranged between the mounting block and the linear sliding rail holder.

3. The pressing mechanism with variable distance position and equal dividing for charging and discharging of the square battery according to claim 1, wherein each of the plurality of probe units further comprises a temperature sensor; the temperature sensor penetrates the mounting block, and a detection terminal of the temperature sensor is flush with a detection terminal of the plurality of probes, the temperature sensor is used for detecting a temperature of the surface of the lithium-ion battery.

4. The pressing mechanism with variable distance position and equal dividing for charging and discharging of the square battery according to claim 2, wherein the cam contact block is U-shaped and is arranged in a rear of the linear sliding rail holder, and the wedge-shaped driving surface and the vertical surface are arranged at a front surface of the cam contact block; the horizontal driving unit comprises a driving block and a fixed block which is connected with the rear terminal of the linear sliding rail holder, and a second linear bearing penetrates the fixed block, and a compression spring is arranged between the driving block and the fixed block; and a plain shaft is arranged in the second linear bearing in a penetrating mode, a front terminal of the plain shaft is connected with the driving block, and a rear terminal of the plain shaft is connected with the cam contact block.

5. The pressing mechanism with variable distance position and equal dividing for charging and discharging of the square battery according to claim 1, wherein the cam is arranged on a supporting rod; a bottom of the supporting rod is arranged at a rear part of the rectangular restraining tray placing frame; the cam is rotatably mounted at a top of the supporting rod through the rotation shaft which is arranged along the left-right direction of the rectangular restraining tray placing frame.

6. The pressing mechanism with variable distance position and equal dividing for charging and discharging of the square battery according to claim 1, wherein each of the plurality of restraining tray holders is a rectangular area defined by a four L-shaped guide block; an anti-reverse pin is arranged on a rear part of the rectangular area while a position pin is arranged on a front part of the rectangular area, a position sensor is arranged in the rectangular area which are used to estimate whether each of the plurality of restraining trays is correctly placed; a first linear bearing used for penetrating the plurality of guide rods and a limiting rod used for limiting a vertical height of the rectangular restraining tray placing frame are arranged on a frame edge of the rectangular restraining tray placing frame.

7. The pressing mechanism with variable distance position and equal dividing for charging and discharging of the square battery according to claim 1, wherein each of the plurality of restraining trays comprises one of the plurality of vertical clapboards, a restraining block, a restraining tray bottom plate, a front plate and a rear plate, and the front plate and the rear plate are arranged at two terminals of the restraining tray bottom plate respectively, and the front plate and the rear plate are linked by a linkage shaft and a guide shaft; and the queue of the plurality of vertical clapboards is slidably arranged on the guide shaft in the front-rear direction; and a restraining block is detachably arranged between the front plate and a foremost of the plurality of vertical clapboards and between the rear plate and the rearmost of the plurality of vertical clapboards respectively to adjust a size of the accommodating space between each two adjacent vertical clapboards of the plurality of vertical clapboards.

8. The pressing mechanism with variable distance position and equal dividing for charging and discharging of the square battery according to claim 7, wherein a contact sensor is arranged at a bottom of the restraining tray bottom plate, and the contact sensor is in contact with the position sensor when each of the plurality of restraining trays is installed in place.

9. The pressing mechanism with variable distance position and equal dividing for charging and discharging of the square battery according to claim 7, wherein a plurality of position holes cooperated with the anti-reverse pin and a plurality of position holes cooperated with the position pin are respectively arrange at a rear part and a front part of the restraining tray bottom plate to realize a positioning of each restraining tray of the plurality of restraining trays.

* * * * *